(12) United States Patent
Cheon et al.

(10) Patent No.: US 11,487,177 B2
(45) Date of Patent: Nov. 1, 2022

(54) DISPLAY DEVICE AND METHOD OF REPAIRING DISPLAY DEVICE

(71) Applicant: SAMSUNG DISPLAY CO., LTD., Yongin-si (KR)

(72) Inventors: Soo Hong Cheon, Seoul (KR); Seong Young Lee, Hwaseong-si (KR); Yong Hee Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/201,205

(22) Filed: Mar. 15, 2021

(65) Prior Publication Data

US 2021/0397056 A1    Dec. 23, 2021

(30) Foreign Application Priority Data

Jun. 23, 2020  (KR) .......................... 10-2020-0076114

(51) Int. Cl.
  *G02F 1/1368* (2006.01)
  *G02F 1/1362* (2006.01)
  *G02F 1/1337* (2006.01)

(52) U.S. Cl.
  CPC ...... *G02F 1/136286* (2013.01); *G02F 1/1337* (2013.01); *G02F 1/1368* (2013.01); *G02F 1/136227* (2013.01); *G02F 1/136263* (2021.01)

(58) Field of Classification Search
  CPC ................................................. G02F 1/136286
  See application file for complete search history.

(56) References Cited

U.S. PATENT DOCUMENTS

| 2017/0139284 A1* | 5/2017 | Ahn ................... G02F 1/134309 |
| 2020/0064663 A1* | 2/2020 | Ra ........................ H01L 27/1255 |
| 2021/0336108 A1* | 10/2021 | Lee .......................... H01L 24/32 |

FOREIGN PATENT DOCUMENTS

| JP | 5179337 | 7/2010 |
| KR | 10-1096731 | 12/2011 |
| KR | 10-1675372 | 11/2016 |

* cited by examiner

*Primary Examiner* — Sang V Nguyen

(74) *Attorney, Agent, or Firm* — F. Chau & Associates, LLC

(57) ABSTRACT

A display device includes a substrate, a scan line disposed on the substrate, a storage line parallel to the scan line and a data line intersecting the scan line and the storage line. First and second transistors are electrically connected to the scan line and the data line. A first pixel electrode is disposed on the first transistor and includes a first stem portion, a first contact portion and a first branch portion. The first branch portion electrically connects the first contact portion to the first stem portion, a second pixel electrode is disposed on the second transistor and includes a second stem portion, a second contact portion and a second branch portion. The second branch portion electrically connects the second contact portion to the second stem portion. A first pattern is disposed between the substrate and the second pixel electrode. The first pattern overlaps the second branch portion.

18 Claims, 9 Drawing Sheets

DISPLAY DEVICE AND METHOD OF REPAIRING DISPLAY DEVICE

CROSS REFERENCE TO RELATED APPLICATION

This application claims priority under 35 U.S.C. § 119 to Korean Patent Application No. 10-2020-0076114, filed on Jun. 23, 2020 in the Korea Intellectual Property Office, the disclosure of which is incorporated by reference in its entirety herein.

TECHNICAL FIELD

The present inventive concepts relate to a display device. More particularly the present inventive concepts relate to a liquid crystal display device and a method of repairing the liquid crystal display device.

DISCUSSION OF RELATED ART

Display devices have become increasingly important with the proliferation of multimedia technology and information. Accordingly, various types of display devices, such as liquid crystal displays (LCD) and organic light emitting displays (OLED) have been developed.

The liquid crystal display is a flat panel display that is widely used among the various display devices. The liquid crystal display device may include two display plates on which electric field generating electrodes are formed respectively and a liquid crystal layer is interposed therebetween. An electric field is generated in the liquid crystal layer by applying a voltage to the electric field generating electrodes. The alignment of the liquid crystal molecules of the liquid crystal layer is determined by the electric field, and the polarization of incident light is controlled, so that the liquid crystal display device may display an image.

In the process of manufacturing the liquid crystal display, a defective pixel may occur, and the defective pixel may emit light on a black screen. The visual recognition of the defective pixel may be prevented by placing a pixel electrode of the defective pixel in an electrically floating state, such as by cutting the pixel electrode. However, the alignment layer may be damaged in the process of cutting the pixel electrode, and light leakage may occur through the damaged alignment layer.

SUMMARY

Exemplary embodiments of the present inventive concepts provide a display device for preventing light leakage by a damaged alignment layer and a method of repairing the display device.

According to an exemplary embodiment of the present inventive concepts, a display device includes a substrate, a scan line disposed on the substrate, a storage line disposed parallel to the scan line and a data line intersecting the scan line and the storage line. First and second transistors are configured to be electrically connected to the scan line and the data line. A first pixel electrode is disposed on the first transistor and includes a first stem portion disposed parallel to the data line, a first contact portion that is configured to be electrically connected to the first transistor, and a first branch portion disposed between the first contact portion and the first stem portion. The first branch portion is configured to electrically connect the first contact portion to the first stem portion. A second pixel electrode is disposed on the second transistor. The second pixel electrode is spaced apart from the first pixel electrode with the scan line disposed therebetween. The second pixel electrode includes a second stem portion disposed parallel to the data line, a second contact portion that is configured to be electrically connected to the second transistor, and a second branch portion disposed between the second contact portion and the second stem portion. The second branch portion is configured to electrically connect the second contact portion to the second stem portion. A first pattern is disposed between the substrate and the second pixel electrode, the first pattern overlapping the second branch portion.

In an exemplary embodiment, the first pattern may extend from the storage line.

In an exemplary embodiment, the first pattern may be symmetrical about the second stem when viewed in the plan view.

In an exemplary embodiment, the display device may further include a second pattern disposed between the substrate and the first pixel electrode and overlapping the first branch portion.

In an exemplary embodiment, the storage line may include a first extension portion and a second extension portion extending parallel to the data line and spaced apart from each other with the first stem portion therebetween, and the second pattern may extend from the first extension portion.

In an exemplary embodiment, the display device may further include a third pattern extending from the second extension portion and symmetrical to the second pattern about the first stem portion when viewed in the plan view.

In an exemplary embodiment, the display device may further include a third transistor connected to the scan line and the storage line.

In an exemplary embodiment, the display device may further include an alignment layer disposed on the first pixel electrode and the second pixel electrode.

In an exemplary embodiment, the display device may further include a common electrode disposed on the alignment layer and a liquid crystal layer disposed between the alignment layer and the common electrode.

According to an exemplary embodiment of the present inventive concepts, a display device includes a substrate, a scan line disposed on the substrate, a storage line disposed parallel to the scan line and a data line intersecting the scan line and the storage line. A transistor includes a gate electrode connected to the scan line, a source electrode connected to the data line, and a drain electrode that is spaced apart from the source electrode. A pixel electrode is disposed on the transistor and includes a stem portion disposed parallel to the data line, a contact portion that is configured to be electrically connected to the drain electrode, and a branch portion disposed between the contact portion and the stem portion. The branch portion is configured to electrically connect the contact portion to the stem portion. A first pattern is disposed between the substrate and the pixel electrode. The first pattern overlaps the branch portion.

In an exemplary embodiment, the first pattern may extend from the storage line.

In an exemplary embodiment, the first pattern may be symmetrical about the stem portion when viewed in a plan view.

In an exemplary embodiment, the storage line may include a first extension portion and a second extension portion extending parallel to the data line and spaced apart from each other with the stem portion therebetween, and the first pattern may extend from the first extension portion.

In an exemplary embodiment, the display device may further include a second pattern extending from the second extension portion and symmetrical to the first pattern about the stem portion when viewed in a plan view.

In an exemplary embodiment, the display device may further include an alignment layer disposed on the pixel electrode.

According to an exemplary embodiment, a method of repairing a display device which includes a substrate, a scan line disposed on the substrate, a storage line disposed parallel to the scan line, a data line intersecting the scan line and the storage line, first and second transistors that are configured to be electrically connected to the scan line and the data line, a first pixel electrode disposed on the first transistor and including a first stem portion disposed parallel to the data line, a first contact portion that is configured to be electrically connected to the first transistor, and a first branch portion disposed between the first contact portion and the first stem portion, the first branch portion is configured to electrically connect the first contact portion to the first stem portion, a second pixel electrode disposed on the second transistor, the second pixel electrode is spaced apart from the first pixel electrode with the scan line interposed therebetween, the second pixel electrode including a second stem portion disposed parallel to the data line, a second contact portion that is configured to be electrically connected to the second transistor, and a second branch portion disposed between the second contact portion and the second stem portion, the second branch portion is configured to electrically connect the second contact portion to the second stem portion, and a first pattern disposed between the substrate and the second pixel electrode, the first pattern overlapping the second branch portion. The method comprises cutting an electrical connection between the second pixel electrode and the second transistor by cutting the second branch portion.

In an exemplary embodiment, the second branch portion may be cut by using a laser.

In an exemplary embodiment, the display device may further include a second pattern disposed between the substrate and the first pixel electrode and overlapping the first branch portion.

In an exemplary embodiment, the method may further include cutting a connection between the first pixel electrode and the first transistor by cutting off the first branch portion.

In an exemplary embodiment, the first branch portion may be cut by using a laser.

According to an exemplary embodiment of the present inventive concepts, a display device includes a substrate. A gate pattern is disposed on the substrate. A data pattern is disposed on the gate pattern. A transparent conductive pattern is disposed on the gate pattern and includes at least one pixel electrode. An alignment layer is disposed on the transparent conductive pattern. At least one pattern is disposed between the substrate and the at least one pixel electrode. The at least one pattern is configured to block incident light that passes through the alignment layer.

The display device according to exemplary embodiments of the present inventive concepts may include the first pattern disposed between the substrate and the pixel electrode and overlapping the branch portion connecting the stem portion of the pixel electrode to the contact portion of the pixel electrode, so that the first pattern y prevent light leakage from occurring through a damaged portion of the alignment layer.

BRIEF DESCRIPTION OF THE DRAWINGS

Illustrative non-limiting exemplary embodiments will be more clearly understood from the following detailed description taken in conjunction with the accompanying drawings.

DETAILED DESCRIPTION OF EXEMPLARY EMBODIMENTS

Hereinafter, display devices and methods of repairing display devices in accordance with exemplary embodiments of the present inventive concepts will be explained in detail with reference to the accompanying drawings.

Figure 1:
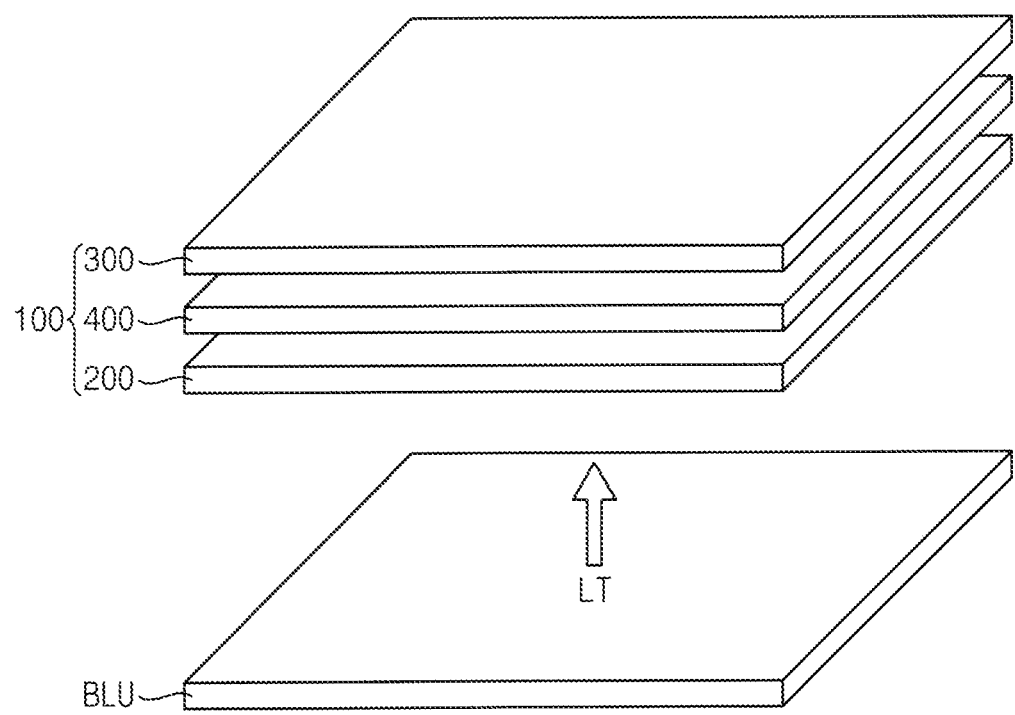
FIG. 1 is an exploded perspective view showing a display device according to an exemplary embodiment of the present inventive concepts.

FIG. 1 is an exploded perspective view showing a display device according to an exemplary embodiment of the present inventive concepts.

Referring to the exemplary embodiment of FIG. 1, the display device may include a display panel 100 and a backlight unit BLU. The display panel 100 may include a first display plate 200, a second display plate 300, a liquid crystal layer 400 disposed between the first display plate 200 and the second display plate 300 (e.g., in a thickness direction of the display panel 100).

The backlight unit BLU may generate light LT and provide the light LT to the display panel 100. In an exemplary embodiment, the light LT provided by the backlight unit BLU may be light of a white color or another predetermined color. The backlight unit BLU may include a light emitting diode LED for generating the light LT.

The light LT provided by the backlight unit BLU may be incident on a lower surface of the display panel 100. For example, as shown in the exemplary embodiment of FIG. 1, the light LT may be incident on a lower surface of the first display plate 200. However, exemplary embodiments of the present inventive concepts are not limited thereto. The backlight unit BLU may include various optical sheets such as a prism sheet, a diffusion sheet, a reflection sheet and a brightness enhancement film to provide a high light efficacy.

Figure 2:
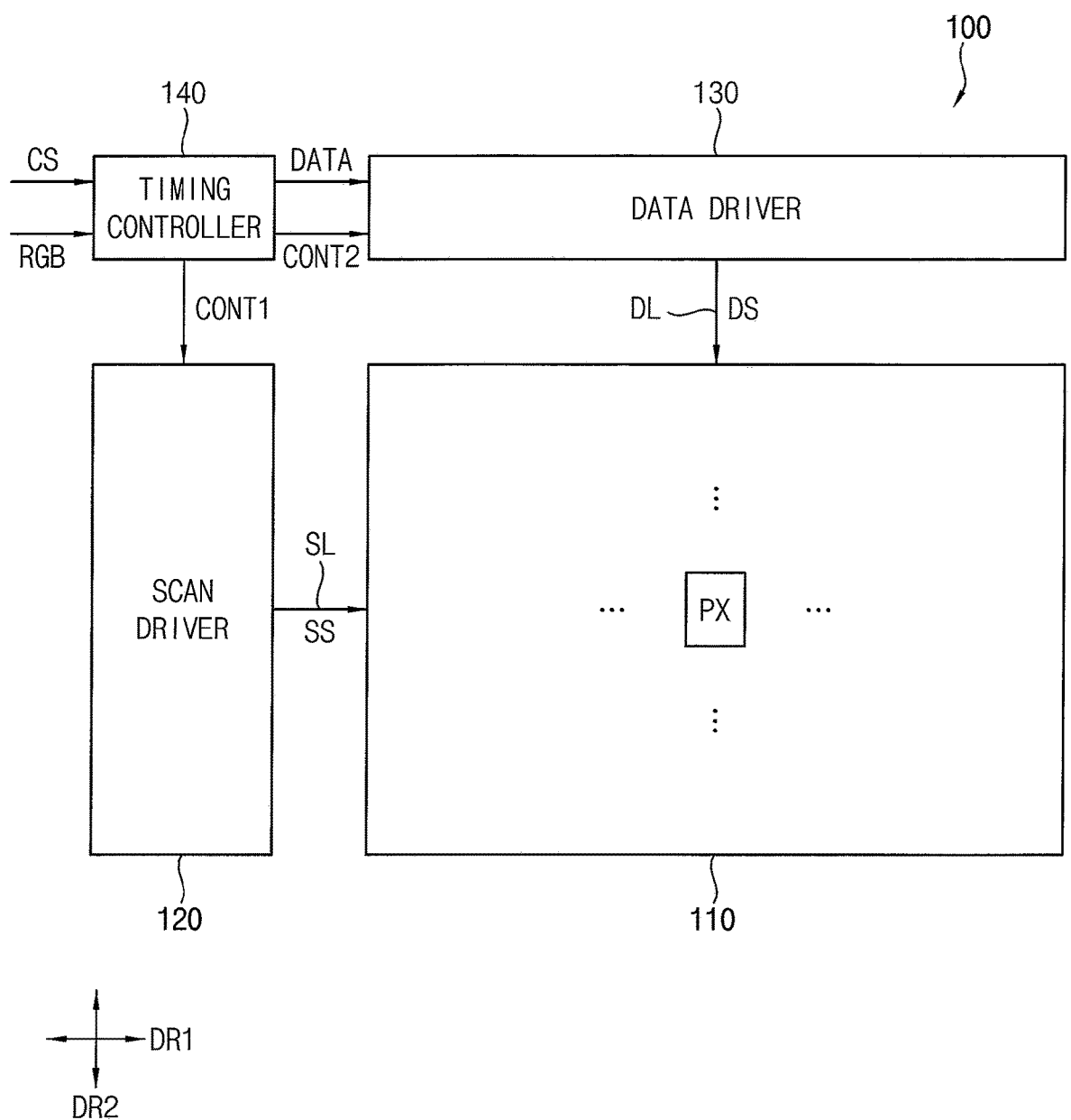
FIG. 2 is a block diagram showing a display panel of the display device of FIG. 1 according to an exemplary embodiment of the present inventive concepts.

FIG. 2 is a block diagram showing the display panel 100 of the display device of FIG. 1 according to an exemplary embodiment of the present inventive concepts.

Referring to the exemplary embodiment of FIG. 2, the display panel 100 may include display unit 110, a scan driver 120, a data driver 130, and a timing controller 140.

The display unit 110 may display an image. A plurality of pixels PX may be disposed in the display unit 110. In an exemplary embodiment, the pixels PX may be arranged in a matrix form along a first direction DR1 and a second direction DR2 that intersects the first direction DR1. For example, as shown in the exemplary embodiment of FIG. 2, the first direction DR1 and the second direction DR2 may be perpendicular to each other. However, exemplary embodiments of the present inventive concepts are not limited thereto and the first direction DR1 and the second direction DR2 may intersect each other at various different angles.

Each of the pixels PX may be electrically connected to one scan line of scan lines SL and one data line of data lines DL. In an exemplary embodiment, the scan lines SL may extend in the first direction D1. In addition, the data lines DL may extend in the second direction D2. For example, as shown in FIG. 2, the first direction DR1 may be a row direction, and the second direction DR2 may be a column direction. However, exemplary embodiments of the present inventive concepts are not limited thereto. For example, in another exemplary embodiment, the scan lines SL may extend in the second direction D2 and the data lines DL may extend in the first direction D1.

The scan driver 120 may generate a scan signal SS based on a first control signal CONT1 provided from the timing controller 140. The scan driver 120 may provide the scan signal SS to the pixels PX disposed in the display unit 110 through the scan lines SL. In an exemplary embodiment, the scan driver 120 may include a plurality of transistors. In another exemplary embodiment, the scan driver 120 may be an integrated circuit.

The data driver 130 may be provided with a second control signal CONT2 and image data DATA from the timing controller 140. The data driver 130 may generate a data signal DS based on the second control signal CONT2 and the image data DATA. The data driver 130 may provide the data signal DS to the pixels PX disposed in the display unit 110 through the data lines DL. In an exemplary embodiment, the data driver 130 may include a shift register, a latch, a digital-analog converter, and the like. However, exemplary embodiments of the present inventive concepts are not limited thereto.

The timing controller 140 may be provided with an image signal RGB and a control signal CS from the outside (e.g., from an external device, etc.). The timing controller 140 may generate image data DMA, a first control signal CONT1, and a second control signal CONT2 by processing the image signal RGB and the control signal CS in relation to the operating conditions of the display unit 110.

In an exemplary embodiment, the image signal RGB may include gray scale data provided to the display unit 110. In addition, the control signal CS may include a horizontal synchronization signal, a vertical synchronization signal, a main clock signal, and the like. The horizontal synchronization signal may represent a time required to display one pixel row of the display unit 110. The vertical synchronization signal may represent a time required to display an image of one frame. The main clock signal may be a signal that serves as a reference for generating signals after the timing controller 140 is synchronized with the scan driver 120 and the data driver 130.

Figure 3:
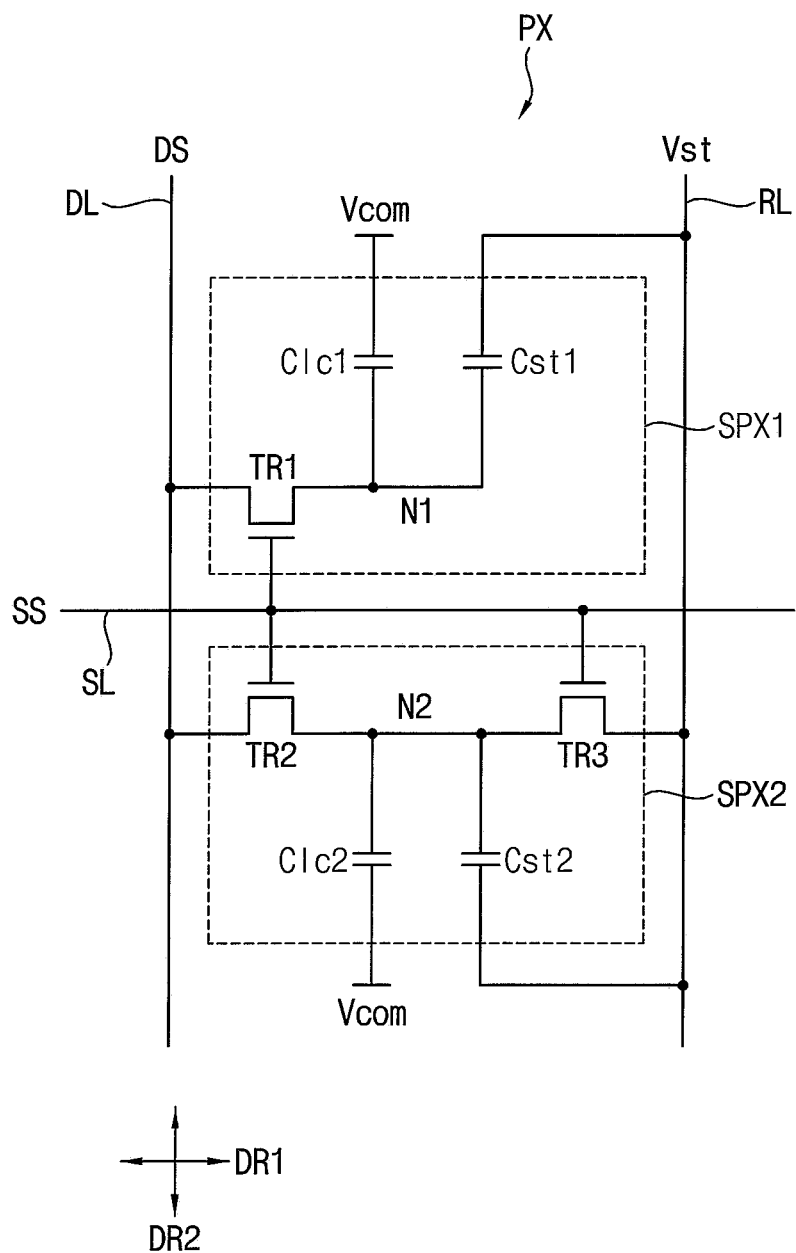
FIG. 3 is an equivalent circuit diagram showing a pixel of the display panel of FIG. 2 according to an exemplary embodiment of the present inventive concepts.

FIG. 3 is an equivalent circuit diagram showing a pixel PX of the display panel 100 of FIG. 2 according to an exemplary embodiment of the present inventive concepts.

Referring to the exemplary embodiment of FIG. 3, the pixel PX may be connected to a scan line SL, a data line DL, and a storage line RL. The pixel PX may be provided with a scan signal SS, a data signal DS, and a storage voltage Vst from the scan line SL, the data line DL, and the storage line RL, respectively.

As shown in the exemplary embodiment of FIG. 3, the pixel PX may include a first transistor TR1, a second transistor TR2, a third transistor TR3, a first liquid crystal capacitor Clc1, a second liquid crystal capacitor Clc2, a first storage capacitor Cst1, and a second storage capacitor Cst2.

The first transistor TR1 may include a first gate electrode, a first source electrode, and a first drain electrode. The first gate electrode may be connected to the scan line SL. The first source electrode may be connected to the data line DL. The first drain electrode may be connected to a first node N1. In an exemplary embodiment, the first transistor TR1 may perform a switching operation based on the scan signal SS provided from the scan line SL, and provide the data signal DS provided from the data line DL to the first node N1.

The second transistor TR2 may include a second gate electrode, a second source electrode, and a second drain electrode. The second gate electrode may be connected to the scan line SL. The second source electrode may be connected to the data line DL, and the second drain electrode may be connected to a second node N2. In an exemplary embodiment, the second transistor TR2 may perform a switching operation based on the scan signal SS provided from the scan line SL, and provide the data signal DS provided from the data line DL to the second node N2.

The third transistor TR3 may include a third gate electrode, a third source electrode, and a third drain electrode. The third gate electrode may be connected to the scan line SL. The third source electrode may be connected to the storage line RL, and the third drain electrode may be connected to a second node N2. In an exemplary embodiment, the third transistor TR3 may perform a switching operation based on the scan signal SS provided from the scan line SE, and provide the storage voltage Vst provided from the storage line RL to the second node N2.

The first liquid crystal capacitor Clc1 may be formed between the first node N1 and a common electrode CE (FIG. 8) to which a common voltage Vcom is provided. The second, liquid crystal capacitor Clc2 may be formed between the second node N2 and the common electrode CE to which the common voltage Vcom is provided.

The first storage capacitor Cst1 may be formed between the first node N1 and the storage line RL to which the storage voltage Vst is provided. The second storage capacitor Cst2 may be formed between the second node N2 and the storage line RL to which the storage voltage Vst is provided.

When a gate-on voltage is applied to the scan line SL, the first transistor TR1, the second transistor TR2, and the third transistor TR3 may be turned on. Accordingly, the data signal DS applied to the data line DL may be applied to the first node N1 and the second node N2 through the first transistor TR1 and the second transistor TR2, respectively, which were turned on by the gate-on voltage. In this exemplary embodiment, the data signals DS applied to the first node N1 and the second node N2 are the same, and the first liquid crystal capacitor Clc1 and the second liquid crystal capacitor Clc2 may be charged with a voltage corresponding to a difference between the common voltage Vcom applied to the common electrode CE and the data signal DS. At the same time, as the voltage of the second node N2 increases or decreases due to the storage voltage Vst applied from the storage line RL through the turned-on third transistor TR3, the voltage charged in the second liquid crystal capacitor Clc2 and the voltage charged in the first liquid crystal capacitor Clc1 become different from each other.

Since the voltage of the first liquid crystal capacitor Clc1 and the voltage of the second liquid crystal capacitor Clc2 are different from each other, a tilt angle of liquid crystal molecules of a first sub pixel SPX1 in which the first liquid crystal capacitor Clc1 is formed becomes different from a tilt angle of liquid crystal molecules of a second sub pixel SPX2 in which the second liquid crystal capacitor Clc2 is formed. Accordingly, a brightness of the first sub pixel SPX1 and a brightness of the second sub pixel SPX2 may be different from each other. Accordingly, then the voltage of the first liquid crystal capacitor Clc1 and the voltage of the second liquid crystal capacitor Clc2 are properly adjusted, an image viewed from a lateral side may be displayed to have a brightness that is substantially the same as the brightness of an image viewed from a front side. Therefore, a lateral visibility of the image may be increased. While the exemplary embodiment of FIG. 3 shows first to third transistors TR1, TR2, TR3, in other exemplary embodiments the numbers of transistors may vary. Additionally, while the first to third transistors TR1, TR2, TR3 shown in the exemplary embodiment of FIG. 3 have single gates, in other exemplary embodiments one or more of the transistors may have a dual gate, etc.

Figure 4:
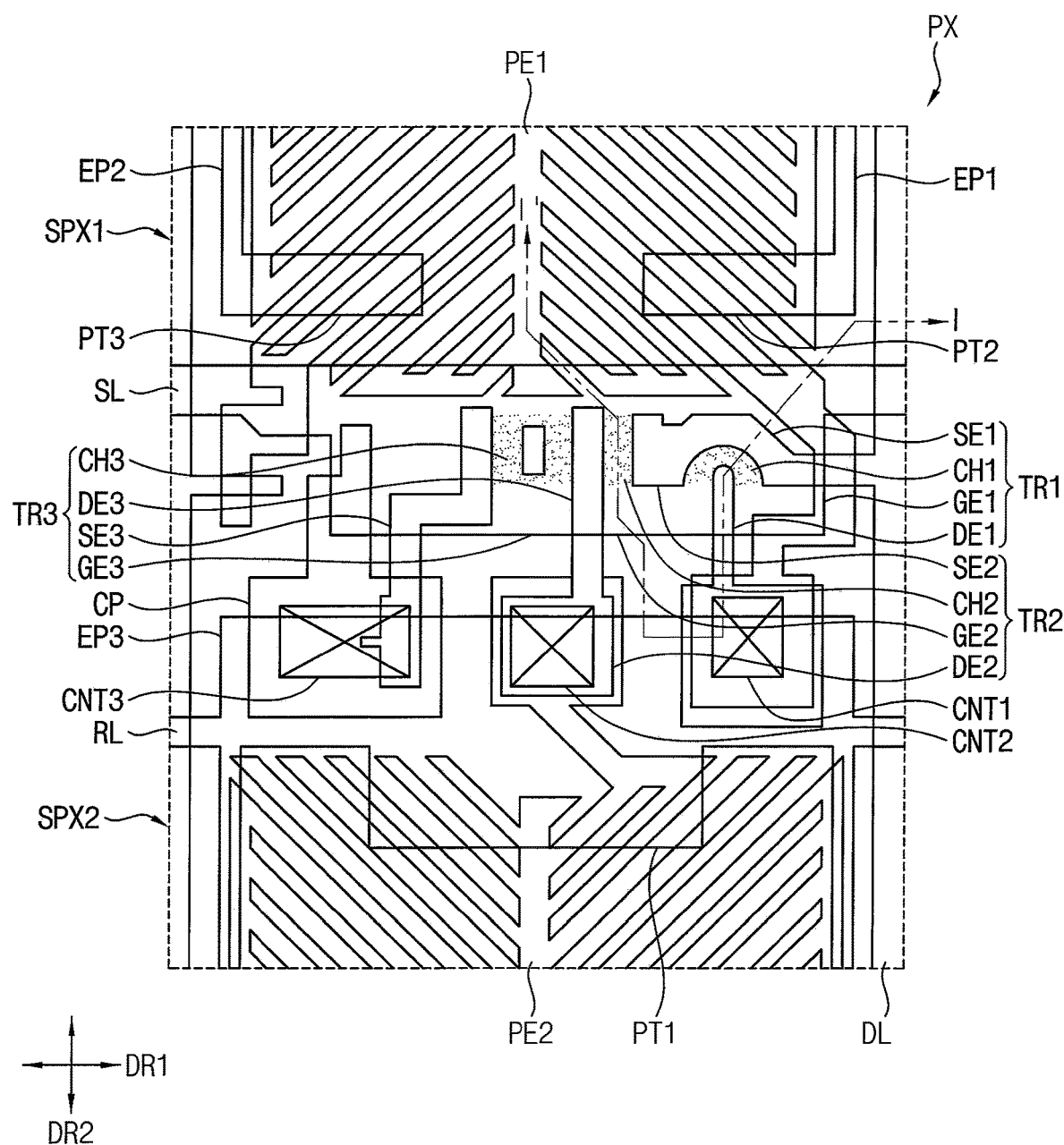
FIG. 4 is a layout diagram showing a pixel of the display panel of FIG. 2 according to an exemplary embodiment of the present inventive concepts.
Figure 5:
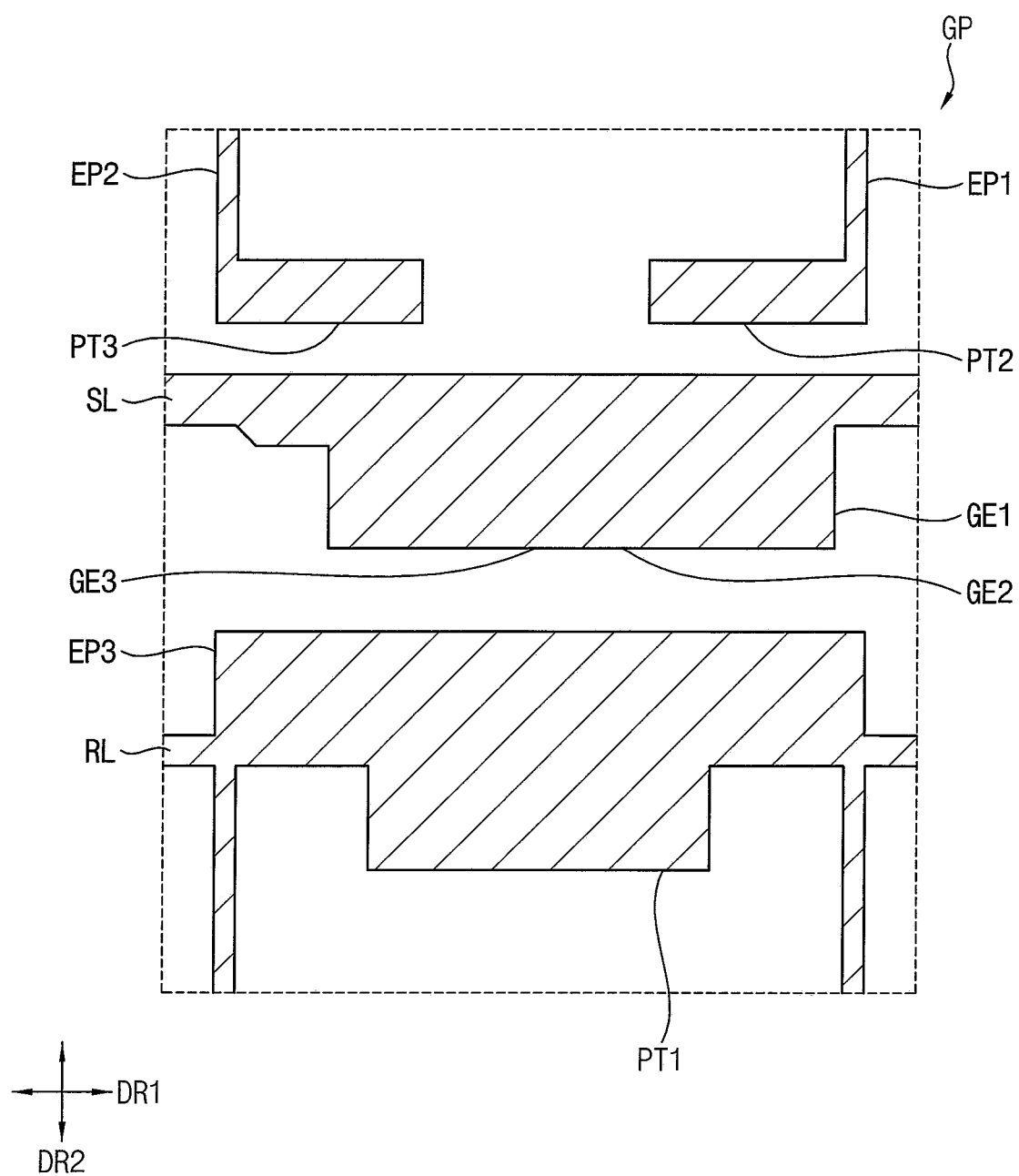
FIG. 5 is a layout diagram showing a gate pattern included in the pixel of FIG. 4 according to an exemplary embodiment of the present inventive concepts.
Figure 6:
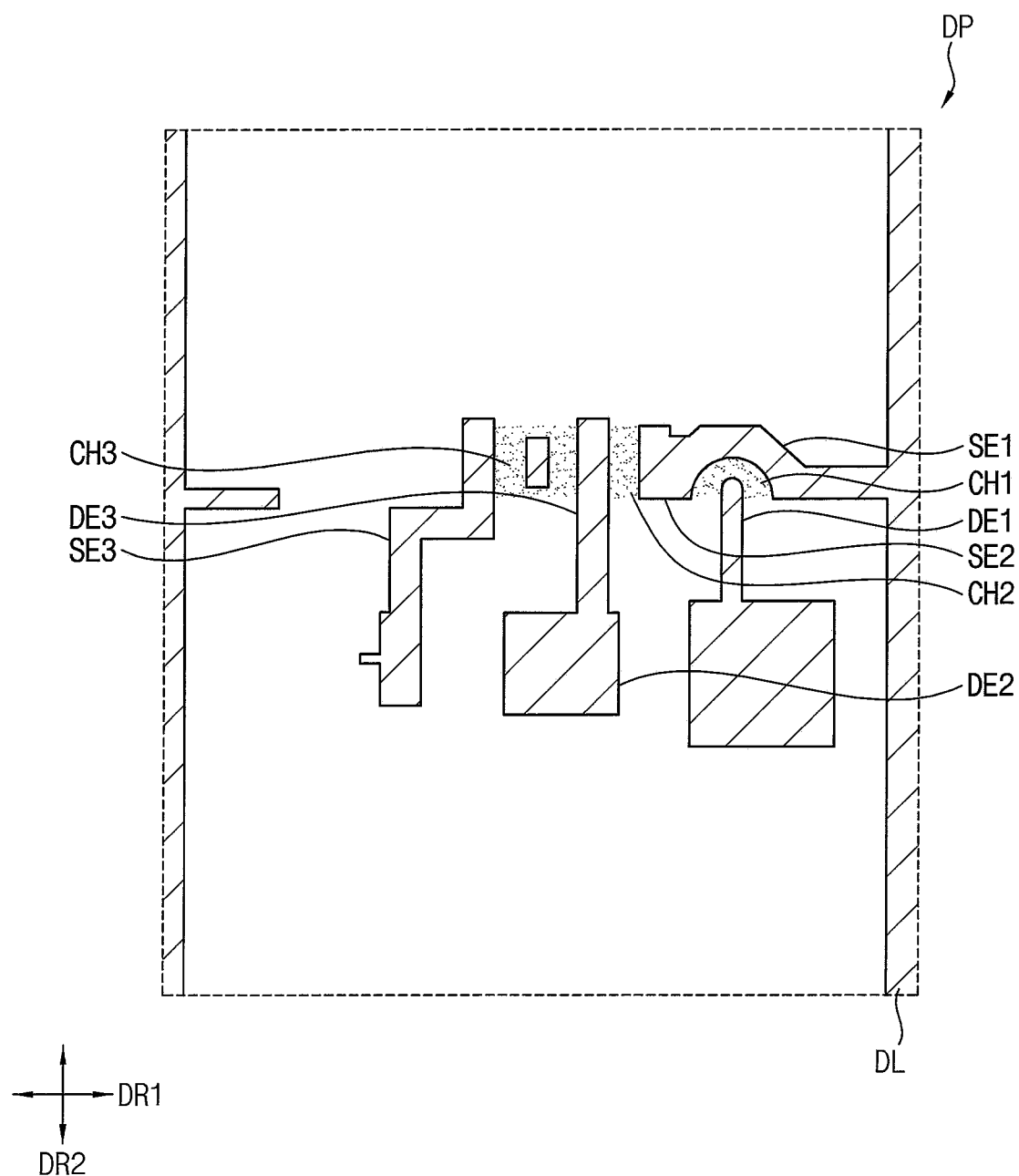
FIG. 6 is a layout diagram showing a data pattern included in the pixel of FIG. 4 according to an exemplary embodiment of the present inventive concepts.
Figure 7:
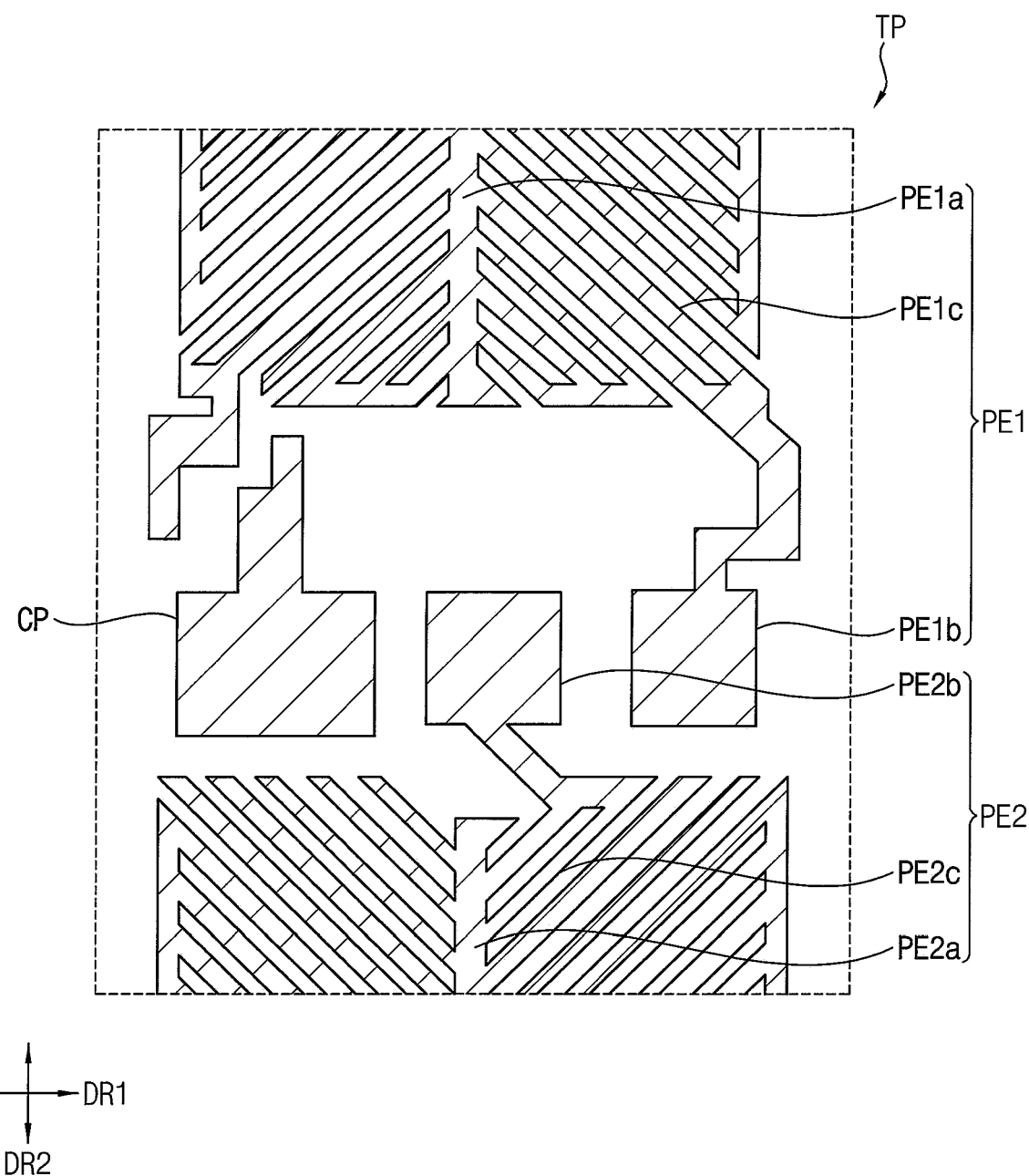
FIG. 7 is a layout diagram showing a transparent conductive pattern included in the pixel of FIG. 4 according to an exemplary embodiment of the present inventive concepts.
Figure 8:
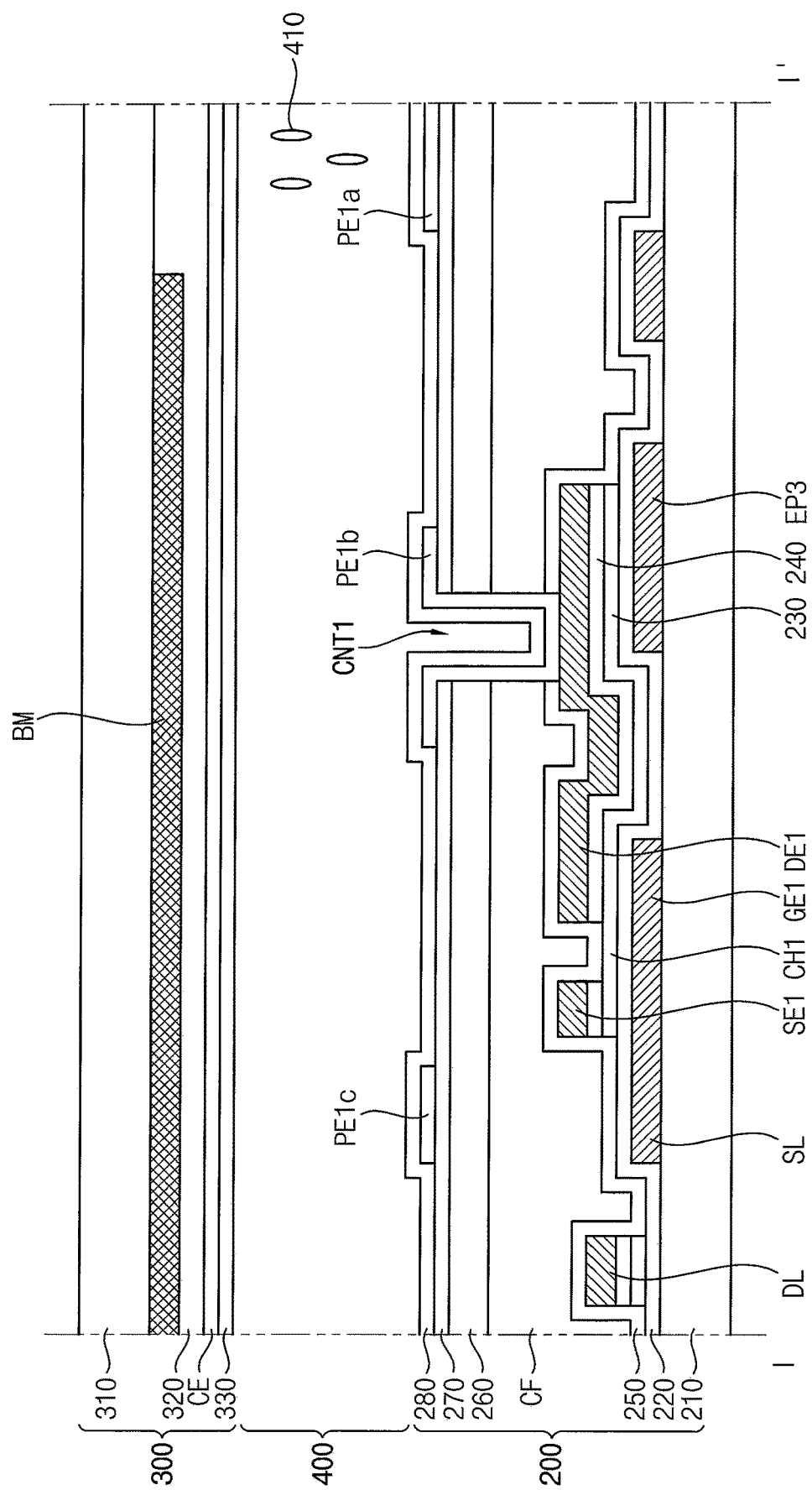
FIG. 8 is a cross-sectional view taken along line I-I' of FIG. 4 according to an exemplary embodiment of the present inventive concepts.

FIG. 4 is a layout diagram showing the pixel PX of the display panel 100 of FIG. 2 according to an exemplary embodiment of the present inventive concepts. FIG. 5 is a layout diagram showing a gate pattern included in the pixel PX of FIG. 4 according to an exemplary embodiment of the present inventive concepts. FIG. 6 is a layout diagram showing a data pattern included in the pixel PX of FIG. 4 according to an exemplary embodiment of the present inventive concepts. FIG. 7 is a layout diagram showing a transparent conductive pattern included in the pixel PX of FIG. 4 according to an exemplary embodiment of the present inventive concepts. FIG. 8 is a cross-sectional view taken along line I-I' of FIG. 4 according to an exemplary embodiment of the present inventive concepts.

Referring to the exemplary embodiments of FIGS. 2, 4, 5, 6, 7, and 8, the display panel 100 may include a first display plate 200, a second display plate 300, and a liquid crystal layer 400 disposed therebetween.

The first display plate 200 and the second display plate 300 may be disposed to face each other. The liquid crystal layer 400 may be disposed between the first display plate 200 and the second display plate 300. The liquid crystal layer 400 may include a plurality of liquid crystal molecules 410. In an exemplary embodiment, the first display plate 200 and the second display plate 300 may be bonded to each other through a sealing member. However, exemplary embodiments of the present inventive concepts are not limited thereto.

The first display plate 200 may include a first substrate 210, a gate pattern GP, a gate insulating layer 220, a data pattern DP, a first passivation layer 250, a color filter CF, an organic insulating layer 260, a second passivation layer 270, a transparent conductive pattern TP, and a first alignment layer 280.

In an exemplary embodiment, the first substrate 210 may be a transparent insulating substrate. For example, the transparent insulating substrate may include at least one material selected from glass, quartz, transparent plastic, and the like. In another exemplary embodiment, the first substrate 210 may be a flexible substrate or a structure in which a plurality of films are laminated.

The gate pattern GP may be disposed on the first substrate 210. The gate pattern GP may include a scan line SL and a storage line RL.

As shown in the exemplary embodiment of FIG. 5, the scan line SL may extend longitudinally substantially in the first direction D1. The scan line SL may include a first gate electrode GE1, a second gate electrode GE2, and a third gate electrode GE3.

The storage line RL may be disposed substantially parallel to the scan line SL and may extend longitudinally substantially in the first direction D1. The storage line RL may be disposed on the same layer as the scan line SL. The storage line RL may be disposed to surround at least a partial portion of lateral sides of a first pixel electrode PE1 and a second pixel electrode PE2. Accordingly, the storage line RL may include a first extension portion EP1 surrounding right portions (e.g., in the first direction DR1) of the first and second pixel electrodes PE1 and PE2, and a second extension portion EP2 surrounding left sides (e.g., in the first direction DR1) of the first and second pixel electrodes PE1 and PE2. The first extension portion EP1 and the second extension portion EP2 may be spaced apart from each other (e.g., in the first direction DR1) and a first stem portion PE1a of the first pixel electrode PE1 and a second stem portion PE2a of the second pixel electrode PE2 may be described later are interposed therebetween.

The storage line RL may be disposed to overlap at least a partial portion of each of the first and second pixel electrodes PE1 and PE2. Accordingly, the storage line RL may include a third extension portion EP3 overlapping at least a partial portion of each of the first and second pixel electrodes PE1 and PE2. The overlapping third extension portion EP3 and the first pixel electrode PE1 may form a first storage capacitor Cst1, and the overlapping third extension portion EP3 and the second pixel electrode PE2 may form a second storage capacitor Cst2.

In an exemplary embodiment, the gate pattern GP may be formed of a single film selected from one compound of the following compounds, a double film selected from two compounds of the following compounds, or a triple film selected from three compounds of the following compounds: aluminum (Al), copper (Cu), molybdenum (Mo), chromium (Cr), titanium (Ti), and tungsten (W). However, exemplary embodiments of the present inventive concepts are not limited thereto. In an exemplary embodiment, the scan line SL and the storage line RL included in the gate pattern GP may be formed substantially simultaneously through the same mask process.

The gate insulating layer 220 may be disposed on the gate pattern GP. In an exemplary embodiment, the gate insulating layer 220 may be formed of silicon nitride, silicon oxide, or the like. In an exemplary embodiment, the gate insulating layer 220 may have a multi-layer structure including at least two insulating layers having different physical properties.

The data pattern DP may be disposed on the gate insulating layer 220. The data pattern DP may include a data line DL, a first source electrode SE1, a first drain electrode DE1, a second source electrode SE2, a second drain electrode DE2, a third source electrode SE3, a third drain electrode DE3, and a semiconductor layer 230. In the semiconductor layer 230, a first channel region CH1 of the first transistor TR1 may be formed between the first source electrode SE1 and the first drain electrode DE1, a second channel region CH2 of the second transistor TR2 may be formed between the second source electrode SE2 and the second drain electrode DE2, and a third channel region CH3 of the third transistor TR3 may be formed between the third source electrode SE3 and the third drain electrode DE3.

The semiconductor layer 230 may be disposed on the gate insulating layer 220. In an exemplary embodiment, the semiconductor layer 230 may be formed of at amorphous silicon, polycrystalline silicon, or the like. In another exemplary embodiment, the semiconductor layer 230 may be formed of an oxide semiconductor. However, exemplary embodiments of the present inventive concepts are not limited thereto. In an exemplary embodiment in which the semiconductor layer 230 is formed of the oxide semiconductor, the semiconductor layer 230 may be formed of at least one compound selected from oxide semiconductors including IGZO, ZnO, $ZnO_2$, CdO, SrO, $SrO_2$, CaO, $CaO_2$, MgO, $MgO_2$, InO, $InO_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

In an exemplary embodiment, the data pattern DP may further include an ohmic contact layer 240. The ohmic contact layer 240 may be disposed on the semiconductor layer 230. In an exemplar embodiment, the ohmic contact layer 240 may be formed of a material such as n+ hydrogenated amorphous silicon doped with a high concentration of n-type impurities such as phosphorus, or may be formed of silicide. However, in an exemplary embodiment in which the semiconductor layer 230 is formed of the oxide semiconductor, the ohmic contact layer 240 may be omitted. Hereinafter, the data pattern DP will be described as including the ohmic contact layer 240 for convenience of explanation.

The data line DL, the first source electrode SE1, the first drain electrode DE1, the second source electrode SE2, the second drain electrode DE2, the third source electrode SE3, and the third drain electrode DE3 may be disposed on the gate insulating layer 220 and the ohmic contact layer 240. The data line DL may substantially extend in the second direction DR2 and intersect both the scan line SL and the storage line RL.

The first source electrode SE1 may protrude from the data line DL (e.g., in the first direction DR1) so that at least a partial portion of the first source electrode SE1 may overlap the first gate electrode GE1. At least a partial portion of the first drain electrode DE1 may overlap the first gate electrode GE1, and may be spaced apart from the first source electrode SE1 (e.g., in the second direction DR2).

Although the exemplary embodiments of FIGS. 4 and 6 show that the first source electrode SE1 has a 'U'-shape when viewed from the top (e.g., in a plan view in a plane defined in the first and second directions DR1, DR2), and the first drain electrode DE1 is surrounded by the first source electrode SE1, exemplary embodiments of the present inventive concepts are not limited thereto. The first gate electrode GE1, the first source electrode SE1, the first drain electrode DE1, and the first channel region CH1 may form the first transistor TR1.

The second source electrode SE2 may protrude from the data line DL so that at least a partial portion of the sec second source electrode SE2 may overlap the second gate electrode GE2. At least a partial portion of the second drain electrode DE2 may overlap the second gate electrode GE2, and may be spaced apart from the second source electrode SE2 (e.g., in the first direction DR1). The second gate electrode GE2, the second source electrode SE2, the second drain electrode DE2, and the second channel region CH2 may form the second transistor TR2.

The third source electrode SE3 may be electrically connected to the storage RL by the connection pattern CP, and at least a partial portion of the third source electrode SE3 may overlap the third gate electrode GE3. At least a partial portion of the third drain electrode DE3 may overlap the third gate electrode GE3, and may be spaced apart from the third source electrode SE3 (e.g., in the first direction DR1). The third gate electrode GE3, the third source electrode SE3, the third drain electrode DE3, and the third channel region CH3 may form the third transistor TR3.

In an exemplary embodiment, the data pattern DP may be formed of a single film selected from one of the following compounds, a double film selected from two of the following compounds, or a triple film selected from three among the following compounds: aluminum (Al), copper (Cu), molybdenum (Mo), chromium (Cr), titanium and tungsten (W). In an exemplary embodiment, the data line DL, the first source electrode SE1, the first drain electrode DE1, the second source electrode SE2, the second drain electrode DE2, the third source electrode SE3, the third drain electrode DE3, the semiconductor layer 230, and the ohmic contact layer 240, which are included in the data pattern DP, may be formed substantially simultaneously through the same mask process.

The first passivation layer 250 may be disposed on the data pattern DP. In an exemplary embodiment, the first passivation layer 250 may be formed of an inorganic insulating material such as silicon nitride and silicon oxide. The first passivation layer 250 may prevent pigment of the organic insulating layer 260 from being introduced to the semiconductor layer 230.

The color filter CF may be disposed on the first passivation layer 250. In an exemplary embodiment, light passing through the color filter CF may express one of primary colors such as red, green, and blue. However, the expressed color of the light passing through the color filter CF is not limited to primary colors. For example, in another exemplary embodiment, the light passing through the color filter CF may express any one of cyan, magenta, yellow, and white.

In an exemplary embodiment, the color filter CF may be formed of a material expressing a color different from each pixel adjacent in the first direction DR1, and may be formed of a material expressing the same color as each pixel adjacent in the second direction DR2. However, exemplary embodiments of the present inventive concepts are not limited thereto. In another exemplary embodiment, the color filter CF may be formed of a material that expresses a different color for each adjacent pixel regardless of the direction. Although the exemplary embodiment of FIG. 8 shows that the color filter CF is disposed in the first display plate 200, exemplary embodiments of the present inventive concepts are not limited thereto. For example, in another exemplary embodiment, the color filter CE may be disposed in the second display plate 300.

The organic insulating layer 260 may be disposed on the first passivation layer 250 and the color filter CF. The organic insulating layer 260 may have planarization properties, and may include an organic material having photosensitivity. However, exemplary embodiments of the present inventive concepts are not limited thereto. For example, in some exemplary embodiments, the organic insulating layer 260 may be omitted.

The second passivation layer 270 may be disposed on the organic insulating layer 260. In an exemplary embodiment, the second passivation layer 270 may be formed of an inorganic insulating material such as silicon nitride and silicon oxide. However, exemplary embodiments of the present inventive concepts are not limited thereto. For example, in some exemplary embodiments, the second passivation layer 270 may be omitted.

A first contact hole CNT1, a second contact hole CNT2, and a third contact hole CNT3 may be formed in the first passivation layer 250, the color filter CF, the organic insulating layer 260, and the second passivation layer 270. The first contact bole CNT1 may overlap at least a partial portion of the first drain electrode DE1. The second contact hole CNT2 may overlap at least a partial portion of the second drain electrode DE2. The third contact bole CNT3 may overlap at least a partial portion of the third extension portion EP3 of the storage line RL and at least a partial portion of the third source electrode SE3.

The transparent conductive pattern TP may be disposed on the second passivation layer 270. The transparent conductive pattern TP may include a transparent conductive material. For example, in an exemplary embodiment, the transparent conductive material may include polycrystalline, single crystalline, or amorphous indium tin oxide (ITO). However, exemplary embodiments of the present inventive concepts are not limited thereto.

The transparent conductive pattern TP may include a first pixel electrode PE1, a second pixel electrode PE2, and a connection pattern CP. The first pixel electrode PE1, the second pixel electrode PE2, and the connection pattern CP may be disposed on the same layer, and may be physically and electrically insulated from each other.

The first pixel electrode PE1 may directly contact the first drain electrode DE1 exposed through the first contact hole CNT1. In addition, the first pixel electrode PE1 may overlap the common electrode CE. Accordingly, the first pixel electrode PE1 and the common electrode CE overlapping each other may form a first liquid crystal capacitor Clc1.

The first pixel electrode PE1 may include a first stem portion PE1a extending substantially in the second direction DR2 and may extend substantially parallel to the data line DL. A first contact portion PE1b is electrically connected to the first drain electrode DE1. A first branch portion PE1c is disposed between the first contact portion PE1b and the first stem portion PE1a and electrically connects the first contact portion PE1b to the first stem portion PE1a.

The first contact portion PE1b may be defined as a region overlapping the first contact hole CNT1. Accordingly, the first contact portion PE1b of the first pixel electrode PE1 may be directly connected to the first drain electrode DE1 exposed by the first contact hole CNT1.

The first stem portion PE1a, the first contact portion PE1b, and the first branch portion PE1c of the first pixel electrode PE1 may be electrically connected to each other. Accordingly, the first stem portion PE1a, the first contact portion PE1b, and the first branch portion PE1c may have the same electric potential.

The second pixel electrode PE may directly contact the second drain electrode DE2 exposed through the second contact hole CNT2. In addition, the second pixel electrode PE2 may overlap the common electrode CE. Accordingly, the second pixel electrode PE2 and the common electrode CE overlapping each other may form a second liquid crystal capacitor Clc2.

The second pixel electrode PE2 may be spaced apart from the first pixel electrode PE1 with the scan line SL interposed therebetween when viewed from the top (e.g., in a plan view in a plane defined in the first and second directions DR1, DR2). The scan line SL may be positioned between the first pixel electrode PE1 and the second pixel electrode PE2 when viewed from the top. For example, as shown in the exemplary embodiment of FIG. 7, the second pixel electrode PE2 may be spaced apart from the first pixel electrode PE1 in the second direction DR2 While the exemplary embodiment of FIG. 7 shows the transparent conductive pattern TP including two pixel electrodes, in another exemplary embodiment the transparent conductive pattern TP may include one or more pixel electrodes and the numbers of the pixel electrodes may vary.

The second pixel electrode PE2 may include a second stem portion PE2a extending substantially in the second direction DR2 and may extend substantially parallel to the data line DL. A second contact portion PE2b is electrically connected to the second drain electrode DE2. A second branch portion PE2c is disposed between the second stem portion PE2a and the second contact portion PE2b and electrically connects the second contact portion PE2b to the second stem portion PE2a.

The second contact portion PE2b may be defined as a region overlapping the second contact hole CNT2. Accordingly, the second contact portion PE2b of the second pixel electrode PE2 may be directly connected to the second drain electrode DE2 exposed by the second contact hole CNT2.

The second stem portion PE2a, the second contact, portion PE2b, and the second branch portion PE2c of the second pixel electrode PE2 may be electrically connected to each other. Accordingly, the second stem portion PE2a, the second contact portion PE2b, and the second branch portion PE2c may have the same electrical potential.

The connection pattern CP may directly contact the third extension portion EP3 of the storage line RL and the third source electrode SE3 exposed through the third contact hole CNT3. Accordingly, the third source electrode SE3 may be electrically connected to the third extension portion EP3 of the storage line RL through the connection pattern CP.

The first alignment layer 280 may be disposed oil the transparent conductive pattern TP. The first alignment layer 280 may induce an initial alignment of the liquid crystal molecules 410 in the liquid crystal layer 400.

The first display plate 200 may include a first pattern PT1, a second pattern PT2, and a third pattern PT3.

The first pattern PT1 may be disposed between the first substrate 210 and the second pixel electrode PE2, and may overlap the second branch portion PE2c of the second pixel electrode PE2. The first pattern PT1 may prevent light leakage through the first alignment layer 280 even in instances in which the first alignment layer 280 is damaged in the process of cutting the second branch portion PE2c of the second pixel electrode PE2 to repair the pixel PX.

In an exemplary embodiment, the first pattern PT1 may be arranged to extend from the storage line RL. For example, as shown in the exemplary embodiment of FIG. 4, the flat pattern PT1 may extend inwardly in the second direction DR2 from the storage line RL.

In an exemplary embodiment, a shape of the first pattern PT1 may be symmetrical with respect to the second stem portion PE2a of the second pixel electrode PE2 when viewed from the top. For example, the shape of the first pattern PT1 may be symmetrical about the second stem portion PE2a in a plan view in a plane defined in the first and second directions DR1, DR2. A first portion of the first pattern PT1 positioned on a right side of the second stem portion PE2a when viewed from the top and a second portion of the first pattern PT1 positioned on a left side of the second stem portion PE2a when viewed from the top may be symmetrical to each other about the second stem portion PE2a. In this exemplary embodiment, a length, width, shape, or area of the first portion of the first pattern PT1 may be substantially the same as a length, width, shape, or area of the second portion of the first pattern PT1, respectively.

The second pattern PT2 may be disposed between the first substrate 210 and the first pixel electrode PE1, and may overlap the first branch portion PE1c of the first pixel electrode PH The second pattern PT2 may prevent light leakage through the first alignment layer 280 even in instances when the first alignment layer 260 is damaged in the process of cutting the first branch portion PE1c of the first pixel electrode PE1 to repair the pixel PX.

In an exemplary embodiment, the second pattern PT2 may extend from the first extension portion EP1 of the storage line RL. For example, as shown in the exemplary embodiment of FIG. 4, the second pattern PT2 may extend inwardly in the first direction DR1 from the first extension portion EP1 of the storage line RL.

The third pattern PT3 may be disposed between the first substrate 210 and the first pixel electrode PE1, and may extend from the second extension portion EP2 of the storage line RL. For example, as shown in the exemplary embodiment of FIG. 4, the third pattern PT3 may extend in the first direction DR1 from the second extension portion EP2 of the storage line RL.

As shown in the exemplary embodiment, the second pattern PT2 and the third pattern PT3 may be arranged to have shapes that are symmetrical to each other about the first stem portion PE1a of the first pixel electrode PE1 when viewed from the top. For example, the shapes of the second pattern PT2 and the third pattern PT3 may be symmetrical to each other about the first stem portion PE1a of the first pixel electrode PE1 in a plan view in a plane defined in the first and second directions DR1, DR2. In this exemplary embodiment, a length, width, shape, or area of the second pattern PT2 may be substantially the same as a length, width, shape, or area of the third pattern PT3, respectively, and a distance from the first stem portion PE1a to the second pattern PT2 in a plan view may be substantially the same as a distance from the first stem portion PE1a to the third pattern PT3 in the plan view.

The second display plate 300 may include a second substrate 310, a black matrix BM, a planarization layer 320, a common electrode CE, and a second alignment layer 330.

The second substrate 310 may be disposed to face the first substrate 210. In an exemplary embodiment, the second substrate 310 may be a transparent insulating substrate. In an exemplary embodiment, the second substrate 310 may be formed of the same material as the first substrate 210.

As shown in the exemplary embodiment of FIG. 8, the black matrix BM may be disposed on the second substrate 310. The black matrix BM may be disposed along the first direction DR1 in an inactive region. The inactive ration may be a region that is a boundary between pixels that are adjacent to each other in the second direction DR2 in which the first pixel electrode PE1 and the second pixel electrode PE2 are not disposed. The black matrix BM may extend longitudinally substantially in the first direction DR1, and may be disposed to overlap the scan line SL.

The black matrix BM may block light from being transmitted to the inactive region, in an exemplary embodiment, the black matrix BM may be formed of a photosensitive composition, an organic material, a metallic material, and the like. For example, the photosensitive composition may include hinder resin, polymeric monomer, polymeric oligomer, pigment, dispersant, and the like. In addition, the metallic material ma include chromium (Cr) and the like.

The black matrix BM extending in the second direction DR2 may not be disposed between pixels that are adjacent to each other in the first direction DR1. The spacing between the pixels adjacent in the first direction DR1 may be arranged so that the liquid crystal alignment may prevent light from passing between the pixels adjacent in the first direction DR1 even without the black matrix BM.

The planarization layer 320 may be disposed on the black matrix BM. The planarization layer 320 may provide a flat surface on the common electrode CE. In an exemplary embodiment, the planarization layer 320 may be formed of an organic material or an inorganic material.

As shown in the exemplary embodiment of FIG. 8, the common electrode CE may be disposed on the planarization layer 320. At least a partial portion of the common electrode CE may overlap the first pixel electrode PE1, and at least one other partial portion of the common electrode CE may overlap the second pixel electrode PE2. In an exemplary embodiment, the common electrode CE may be formed of a transparent conductive material such as ITO or IZO, or a reflective metal such as aluminum (Al), silver (Ag), chromium (Cr), or an alloy thereof.

The second alignment layer 330 may be disposed on the common electrode CE. The second alignment layer 330 may induce an initial alignment of the liquid crystal molecules 410 in the liquid crystal layer 400. In an exemplary embodiment, the second alignment layer 330 may be formed of substantially the same material as the first alignment layer 280.

The liquid crystal layer 400 may include a plurality of liquid crystal molecules 410. In an exemplary embodiment, the liquid crystal molecules 410 may be vertically aligned in the initial alignment state while having negative dielectric anisotropy. The liquid crystal molecules 410 may have a predetermined pre-tilt angle in the initial alignment state. The initial alignment of the liquid crystal molecules 410 may be induced by the first alignment layer 280 and the second alignment layer 330. When an electric field is formed between the first display plate 200 and the second display plate 300, the liquid crystal molecules 410 may tilt or rotate in a specific direction, thereby changing a polarization state of light passing through the liquid crystal layer 400.

Figure 9:
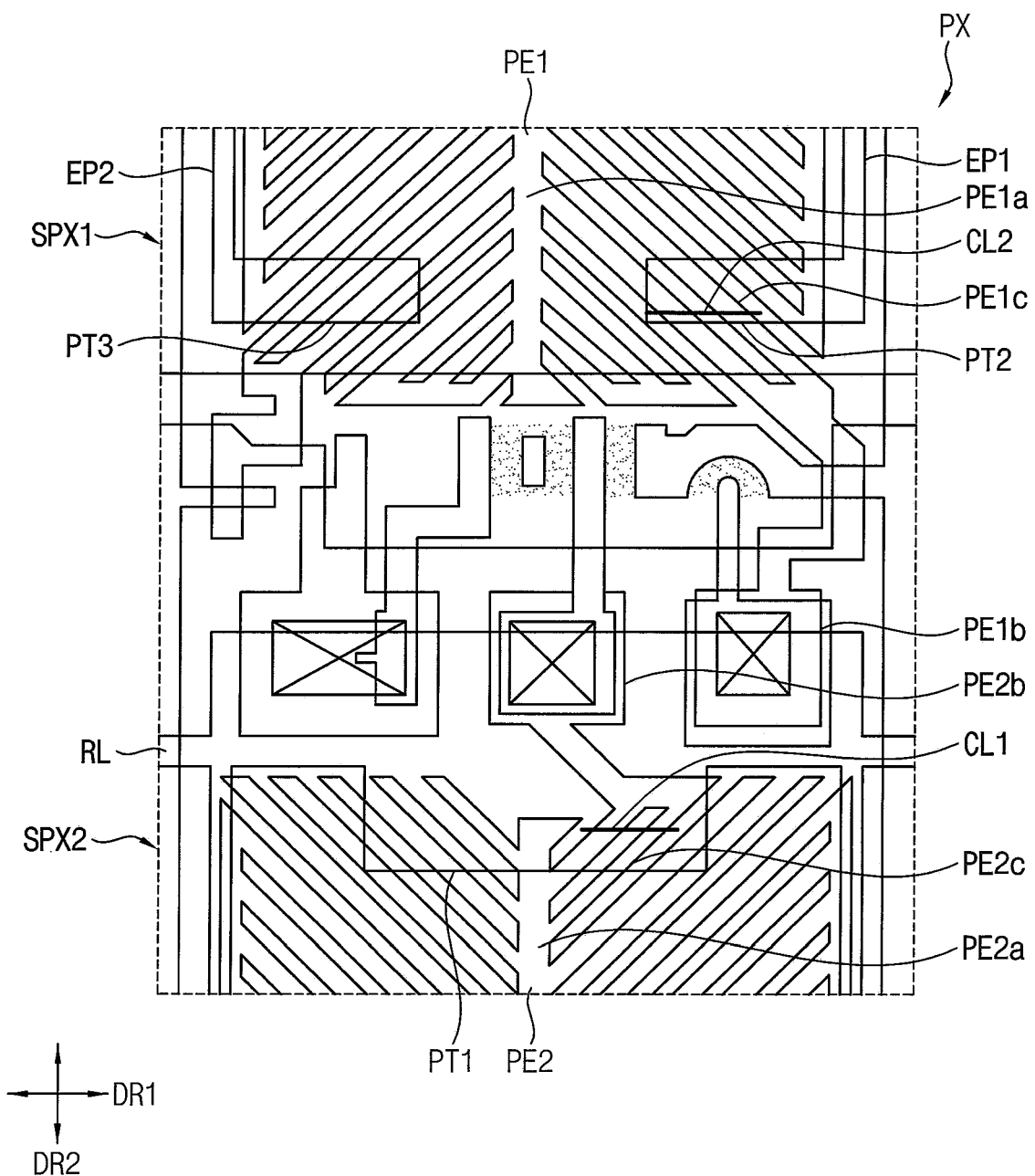
FIG. 9 is a layout diagram showing a method of repairing a display device according to an exemplary embodiment of the present inventive concepts.

FIG. 9 is a layout view showing a method of repairing the display device according to an exemplary embodiment of the present inventive concepts.

In instances in which a defect occurs in a pixel, the defective pixel may be repaired, so that the pixel having the defect may maintain a black state. For example, a data signal may not be applied to a pixel electrode of the pixel in which the defect has occurred, so that the defective pixel may not be visually recognized.

Referring to FIGS. 4, 8 and 9, in a method of repairing a display device according to an exemplary embodiment, the second branch portion PE2c of the second pixel electrode PE2 may be cut along a first cutting line CE so that a connection between the second pixel electrode PE2 and the second transistor TR2 may be blocked. When the second branch portion PE2c is cut, the second stem portion PE2a and the second contact portion PE2b of the second pixel electrode PE2 are disconnected from each other, thereby preventing the data signal from being applied to the second pixel electrode PE2, so that the second pixel electrode PE2 may be in an electrically floating state. Accordingly, the liquid crystal molecules 410 between the second pixel electrode PE2 and the common electrode CE maintain the initial arrangement state, so that a defective pixel may not be visually recognized.

In exemplary embodiment, the second branch portion PE2c may be cut using a laser. When the second branch portion PE2c is cut using the laser, the first alignment layer 280 disposed on the second pixel electrode PE2 is damaged, so that light leakage may occur through the damaged portion of the first alignment layer 280. However, the display device according to an exemplary embodiment of the present inventive concepts includes the first pattern PT1 overlapping the second branch portion PE2c, so that the first pattern PT1 may block light incident to the first alignment layer 280 from the backlight unit BLU of FIG. 1. Accordingly, the light leakage through the damaged portion of the first alignment layer 280 may be prevented.

In the method of repairing a display device according to an exemplary embodiment of the present inventive concepts, the first branch portion PE is of the first pixel electrode PE1 is cut along a second cutting line CL2, so that a connection between the first pixel electrode PE1 and the first transistor TR1 may be blocked. When the first branch portion PE1c is cut, the first stem portion PE1a and the first contact portion PE1b of the first pixel electrode PE1 are disconnected with each other, thereby preventing the data signal from being applied to the first pixel electrode PE1, so that the first pixel electrode PE1 may be in an electrically floating state. Accordingly, the liquid crystal molecules 410 between the first pixel electrode PE1 and the common electrode CE maintain the initial arrangement state, so that a defective pixel may not be visually recognized.

In an exemplary embodiment, the first branch portion PE1c may be cut using the laser. When the first branch portion PE1c is cut using the laser, the first alignment layer 280 disposed on the first pixel electrode PE1 is damaged, so that light leakage may occur through the damaged portion of the first alignment layer 280. However, the display device according to exemplary embodiments of the present inventive concepts includes the second pattern PT2 overlapping the first branch portion PE1c, so that the second pattern PT2 may block light incident to the first alignment layer 280 from the backlight unit BLU, and accordingly, the light leakage through the damaged portion of the first alignment layer 280 may be prevented.

The display device according to an exemplary embodiment of the present inventive concepts may be applied to a display device included in a computer, a notebook, a mobile phone, a smartphone, a smart pad, a PMP, a PDA an MP3 player, or the like.

Although the display devices and methods of repairing display devices according to exemplary embodiments of the present inventive concepts have been described with reference to the drawings, the illustrated embodiments are examples, and may be modified and changed by a person having ordinary knowledge in the relevant technical field without departing from the present inventive concepts.

What is claimed is:

1. A display device comprising:
a substrate;
a scan line disposed on the substrate;
a storage line disposed parallel to the scan line;
a data line intersecting the scan line and the storage line;
first and second transistors that are configured to be electrically connected to the scan line and the data line;
a first pixel electrode disposed on the first transistor and including a first stem portion disposed parallel to the data line, a first contact portion that is configured to be electrically connected to the first transistor, and a first branch portion disposed between the first contact portion and the first stem portion, the first branch portion is configured to electrically connect the first contact portion to the first stem portion;
a second pixel electrode disposed on the second transistor, the second pixel electrode is spaced apart from the first pixel electrode with the scan line disposed therebetween, the second pixel electrode including a second stem portion disposed parallel to the data line, a second contact portion that is configured to be electrically connected to the second transistor, and a second branch portion disposed between the second contact portion and the second stem portion, the second branch portion is configured to electrically connect the second contact portion to the second stem portion; and
a first pattern disposed between the substrate and the second pixel electrode, the first pattern overlapping the second branch portion and extending from the storage line solely in a direction away from the first electrode.

2. The display device of claim 1, wherein a shape of the first pattern is symmetrical about the second stem portion.

3. The display device of claim 1, further comprising:
a second pattern disposed between the substrate and the first pixel electrode, the second pattern overlapping the first branch portion.

4. The display device of claim 3, wherein the storage line includes a first extension portion and a second extension portion extending parallel to the data line, the first extension portion and the second extension portion are spaced apart from each other with the first stem portion disposed therebetween, and the second pattern is arranged to extend from the first extension portion.

5. The display device of claim 4, further comprising:
a third pattern arranged to extend from the second extension portion and having a shape that is symmetrical to the second pattern about the first stem portion.

6. The display device of claim 1, further comprising:
a third transistor that is configured to be electrically connected to the scan line and the storage line.

7. The display device of claim 1, further comprising:
an alignment layer disposed on the first pixel electrode and the second pixel electrode.

8. The display device of claim 7, further comprising:
a common electrode disposed on the alignment layer; and
a liquid crystal layer disposed between the alignment layer and the common electrode.

9. A display device comprising:
a substrate;
a scan line disposed on the substrate and extending longitudinally in a first direction;
a storage line extending longitudinally in the first direction in be parallel to the scan line;
a data line extending longitudinally in a second direction perpendicular to the first direction to intersect the scan line and the storage line;
a transistor including a gate electrode connected to the scan line, a source electrode connected to the data line, and a drain electrode that is spaced apart from the source electrode;
a pixel electrode disposed on the transistor and including a stem portion disposed parallel to the data line, a contact portion that is configured to be electrically connected to the drain electrode, and a branch portion disposed between the contact portion and the stem portion, the branch portion is configured to electrically connect the contact portion to the stem portion; and a first pattern disposed between the substrate and the pixel electrode, the first pattern overlapping the branch portion, the first pattern extending longitudinally in the first direction from the storage line.

10. The display device of claim 9, wherein a shape of the first pattern is symmetrical about the stem portion.

11. The display device of claim 9, wherein the storage line includes a first extension portion and a second extension portion extending parallel to the data line, the first extension portion and the second extension portion are spaced apart from each other with the stem portion disposed therebetween, and the first pattern is arranged to extend from the first extension portion.

12. The display device of claim 11, further comprising:
a second pattern arranged to extend from the second extension portion and having a shape that is symmetrical to the first pattern about the stem portion.

13. The display device of claim 9, further comprising:
an alignment layer disposed on the pixel electrode.

14. A method of repairing a display device, which includes a substrate, a scan line disposed on the substrate, a storage line disposed parallel to the scan line, a data line intersecting the scan line and the storage line, first and second transistors that are configured to be electrically connected to the scan line and the data line, a first pixel electrode disposed on the first transistor and including a first stein portion disposed parallel to the data line, a first contact portion that is configured to be electrically connected to the first transistor, and a first branch portion disposed between the first contact portion and the first stem portion, the first branch portion is configured to electrically connect the first contact portion to the first stem portion, a second pixel electrode disposed on the second transistor, the second pixel electrode is spaced apart from the first pixel electrode with the scan line interposed therebetween, the second pixel electrode including a second stem portion disposed parallel to the data line, a second contact portion that is configured to be electrically connected to the second transistor, and a second branch portion disposed between the second contact portion and the second stem portion, the second branch portion is configured to electrically connect the second contact portion to the second stem portion, and a first pattern disposed between the substrate and the second pixel electrode, the first pattern overlapping the second branch portion, the method comprising:
cutting an electrical connection between the second pixel electrode and the second transistor by cutting the second branch portion.

15. The method of claim 14, wherein the second branch portion is cut by using a laser.

16. The method of claim 14, wherein the display device further includes a second pattern disposed between the substrate and the first pixel electrode, the second pattern overlaps the first branch portion.

17. The method of claim 16, further comprising:
cutting an electrical connection between the first pixel electrode and the first transistor by cutting the first branch portion.

18. The method of claim 17, wherein the first branch portion is cut by using a laser.

* * * * *